United States Patent [19]

Gamell

[11] 3,948,053
[45] Apr. 6, 1976

[54] SYSTEM FOR UTILIZING WASTE HEAT OF AN INTERNAL COMBUSTION ENGINE

[75] Inventor: Joseph A. Gamell, Kalamazoo, Mich.

[73] Assignee: Joseph Gamell Industries, Incorporated, Kalamazoo, Mich.

[22] Filed: Apr. 14, 1975

[21] Appl. No.: 567,704

Related U.S. Application Data

[63] Continuation of Ser. No. 411,328, Oct. 31, 1973, abandoned, which is a continuation of Ser. No. 250,879, May 8, 1972, abandoned.

[52] U.S. Cl. .............................. 60/618; 123/119 C
[51] Int. Cl.² ......................................... F01K 23/10
[58] Field of Search ............ 60/604, 616, 618, 614, 60/39.18 R; 123/119 C

[56] References Cited
UNITED STATES PATENTS

| | | | |
|---|---|---|---|
| 1,339,177 | 5/1920 | Dyer | 60/618 |
| 1,915,594 | 6/1933 | Cobb | 60/41.46 |
| 2,109,237 | 2/1938 | Lustig | 60/618 |
| 2,252,528 | 8/1941 | Sikorsky et al. | 60/618 |
| 2,360,969 | 10/1944 | Newcombe | 60/39.18 R |
| 2,379,183 | 6/1945 | Price | 60/604 |
| 2,602,901 | 7/1952 | Pielstick | 60/618 |
| 2,919,540 | 1/1960 | Percival | 60/618 |
| 3,505,811 | 4/1970 | Underwood | 60/39.18 R |
| 3,830,062 | 8/1974 | Morgan et al. | 60/618 |

FOREIGN PATENTS OR APPLICATIONS

| | | | |
|---|---|---|---|
| 266,483 | 3/1927 | United Kingdom | 60/618 |
| 596,855 | 5/1934 | Germany | 60/618 |
| 608,427 | 4/1926 | France | 60/618 |
| 298,445 | 9/1919 | Germany | 60/618 |

*Primary Examiner*—Manuel A. Antonakas
*Attorney, Agent, or Firm*—Gordon W. Hueschen

[57] ABSTRACT

Waste heat generated by an internal combustion engine is utilized by an apparatus comprising a supercharger, a turbine drivably engaging the supercharger, a vaporizer, and a condenser. The turbine, the vaporizer and the condenser form a closed loop within which a motive fluid is circulated. The vaporizer is intimately associated with the internal combustion engine, and the motive fluid within the vaporizer is converted to gaseous form by heat transfer from the engine. The vaporized fluid is then used to drive the turbine which, in turn, drives the supercharger, thereby increasing the efficiency of the engine. Spent motive fluid is recovered from the turbine, condensed, and recycled to the vaporizer.

6 Claims, 5 Drawing Figures

SYSTEM FOR UTILIZING WASTE HEAT OF AN INTERNAL COMBUSTION ENGINE

This is a Continuation of application Ser. No. 411,328, filed Oct. 31, 1973, now abandoned; which is in turn a continuation of application Ser. No. 250,879, filed May 8, 1972, also now abandoned.

BACKGROUND OF THE INVENTION

This invention relates to internal combustion engines.

During the operation of an internal combustion engine a substantial amount of energy is given off as heat and is dissipated to the ambient atmosphere and lost. Supercharging of an internal combustion engine increases the power output of the engine and is desirable for aircraft engines for take-off power and to compensate for the relatively rare atmosphere encountered at higher altitudes, for automotive engines at high speeds, and for Diesel engines for increased output. However, power to drive the supercharger normally is provided by the internal combustion engine itself, thus a portion of the total engine power output, which otherwise would be available for other purposes, must be allocated to drive the supercharger. Usually superchargers are driven by gearing directly to the engine, or through a gear box and clutches so as to provide more than one speed ratio. It is also known to drive a supercharger by means of an exhaust gas turbine; however, such an arrangement increases the exhaust gas pressure and thus decreases engine efficiency.

It is an object of the present invention to provide means whereby waste heat of an internal combustion engine is utilized to dirve engine accessory items such as a supercharger, or the like.

It is a further object of the present invention to provide means for driving a supercharger which is independent of engine revolution rate so that pressure generated by the supercharger can be regulated as required to reduce undesirable exhaust emissions at low engine revolution rate.

Still other objects of this invention will present themselves to one skilled in the art upon reference to the ensuing specification, the drawings, and the claims.

SUMMARY OF THE INVENTION

The present invention contemplates an apparatus for utilization of waste heat from an internal combustion engine which comprises supercharger means having an impeller situated in an engine air intake conduit; turbine means driving said supercharger means and provided with a motive fluid inlet port and a motive fluid outlet port; vaporizer means intimately associated with the internal combustion engine, heated by the engine, and provided with a motive fluid outlet which communicates with the turbine motive fluid inlet port and further provided with a motive fluid inlet; condenser means provided with a motive fluid inlet which communicates via a confined flow passageway with the turbine exhaust port and further provided with a motive fluid outlet which communicates with the vaporizer inlet. A check valve means is situated in said confined flow passageway between the turbine exhaust port and the condenser inlet and permits only unidirectional flow of motive fluid from the turbine means to the condenser means. The turbine means, vaporizer means, and condenser means together define a closed loop in which a motive fluid circulates.

The method of this invention contemplates providing a turbine means which drivably engages an accessory means for an internal combustion engine, vaporizing a motive fluid by means of heat transfer from a hot internal combustion engine, driving the turbine means with the vaporized motive fluid, recovering spent motive fluid from the turbine means, condensing the recovered motive fluid, and recycling the condensed motive fluid for subsequent vaporization.

DESCRIPTION OF PREFERRED EMBODIMENTS

Figure 1:
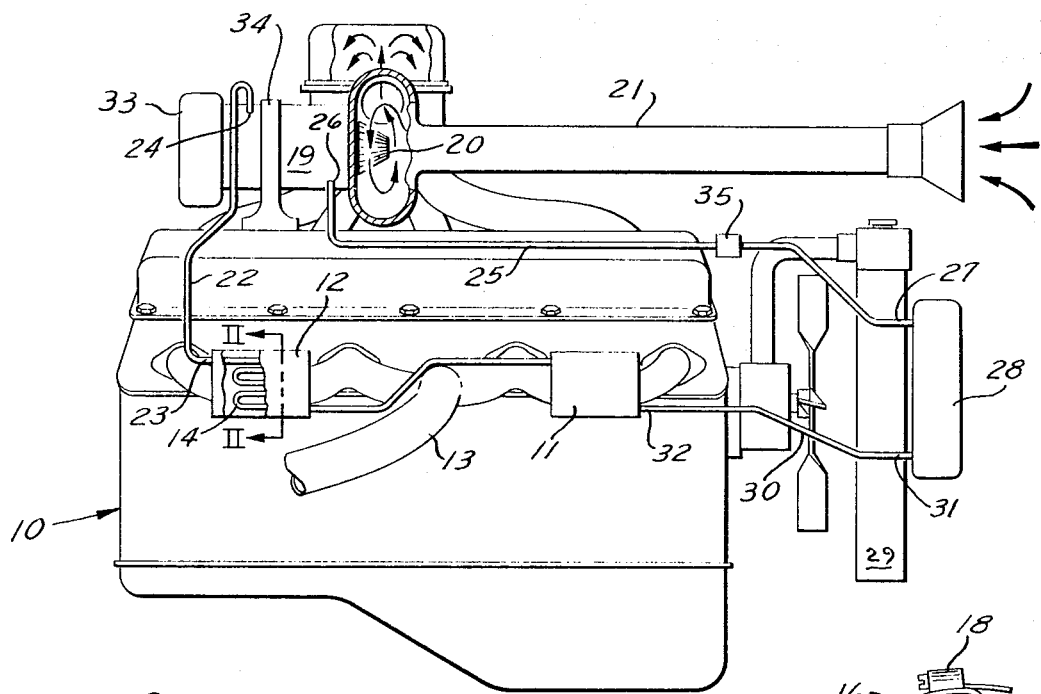
FIG. 1 is a side elevational view, partially broken away, of an internal combustion engine equipped with apparatus of this invention.
Figure 2:
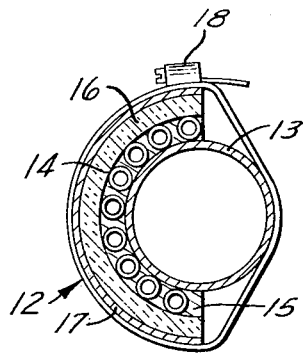
FIG. 2 is a sectional view taken along line II—II in FIG. 1.

Referring to FIG. 1, internal combustion engine 10 is provided with vaporizers 11 and 12 mounted on exhaust manifold 13. As shown in FIG. 2, vaporizer 12 comprises tube bank 14, covered by casing 15 made of a heat conductive material such as aluminum, copper, or the like, and situated adjacent to exhaust manifold 13. Insulating sheath 16 of asbestos or the like covers casing 15 and is, in turn, covered by protective covering 17 which can be made of chromed or brushed metal sheet, or the like. Clamp means 18 holds vaporizer 12 in intimate association with exhaust manifold 13 to assure the requisite heat transfer to vaporizer 12.

Turbine 19 is mounted on top of engine 10 by means of bracket 34 and drives supercharger impeller 20 which is situated in air intake conduit 21. Motive fluid vaporized in vaporizers 11 and 12 is transported to turbine 19 via conduit 22 which communicates with vaporizer outlet 23 and turbine inlet port 24. Confined flow passageway 25 communicates between turbine exhaust port 26 and inlet 27 of condenser 28 mounted in front of radiator 29 so that air circulating through radiator 29 also cools condenser 28 thereby cooling and condensing spent motive fluid recovered from turbine 19. Check valve 35 prevents return of spent motive fluid to turbine 19 and assures unidirectional flow of spent motive fluid to condenser 28. Conduit 30 provides communication between condenser outlet 31 and inlet 32 of vaporizer 11 and serves to transport condensed motive fluid for recycling through vaporizers 11 and 12.

If desired, an additional accessory such as alternator 33 can be driven from the drive shaft of turbine 19.

Figure 3:
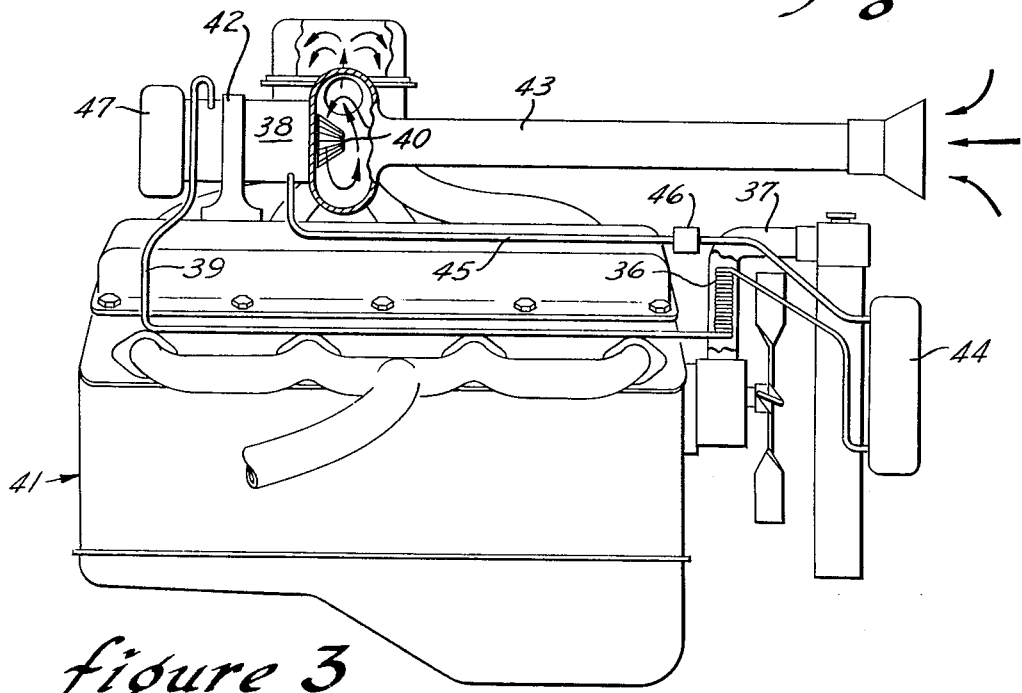
FIG. 3 is a side elevational view, partially broken away, showing an alternate embodiment of this invention.

In an alternate embodiment of this invention shown in FIG. 3, vaporizer 36 is in the form of a coil situated within engine cooling water hose 37. Motive fluid from vaporizer 36 is transported to turbine 38 through conduit 39. Turbine 38 is mounted on engine 41 by means of bracket 42 and drives supercharger impeller 40 situated in air intake conduit 43. Spent motive fluid is recovered from turbine 38 and transported to condenser 44 through confined flow passageway 45. Check valve 46 is provided in passageway 45 to assure unidirectional flow of spent motive fluid to condenser 44. As an additional accessory, compressor 47 for an air conditioning unit can be mounted on the output shaft of turbine 38. Vaporizer 36, instead of being located within hose 39 can also be in oil contained within the oil sump of internal combustion engine 41.

Figure 4:
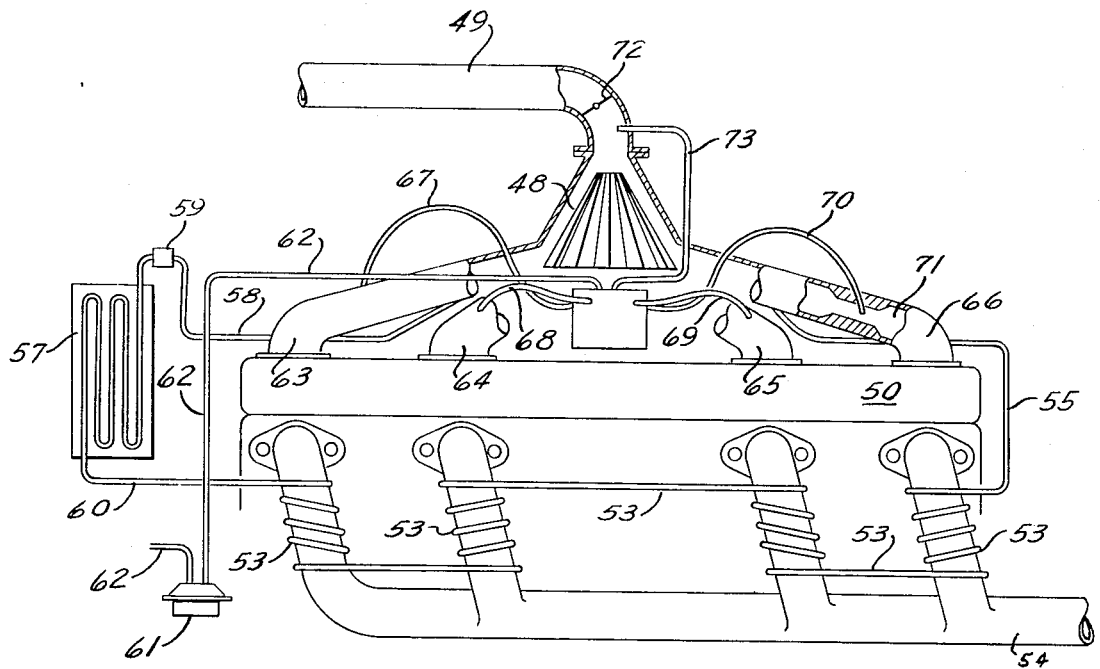
FIG. 4 is a partial side elevational view of an internal combustion engine showing yet another embodiment of this invention.
Figure 5:
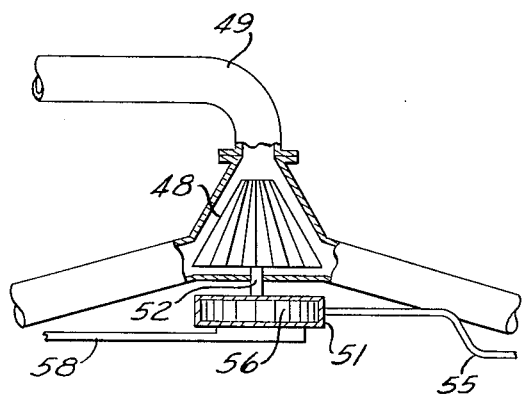
FIG. 5 shows a portion of the view shown in FIG. 4, enlarged and further broken away to show the arrangement of the turbine and supercharger impeller.

Another embodiment of the present invention is shown in FIGS. 4 and 5 where supercharger impeller 48, situated in air intake 49, is mounted horizontally above internal combustion engine 50 and is driven by turbine 51 through shaft 52. Vaporizer coils 53 are wrapped around exhaust manifold 54 and the vaporized motive fluid is transported to turbine 51 via conduit 55 and impinges on turbine rotor 56. Spent motive fluid is transported to condenser 57 by means of confined flow passageway 58, provided with check valve 59, and condensed motive fluid is recycled to vaporizer coils 53 through conduit 60. In the embodiment shown in FIG. 4 fuel is supplied to engine 50 by means of fuel pump 61 in fuel line 62 and distributed to intake manifold branches 63, 64, 65 and 66 via lines 67, 68, 69 and 70, respectively. Each branch of the intake manifold is provided with a removable venturi such as venturi 71 in intake manifold branch 66. Additional fuel is introduced into air intake conduit 49 between throttle plate 72 and impeller 48 through line 73.

The selection of a motive fluid for use in the present system depends to some extent on the vaporizer location and the temperatures attained therein. Suitable motive fluids that can be used in the apparatus of this invention include water, mixtures of water and ethylene glycol, relatively high boiling halogenated hydrocarbons such as methylene chloride, trichlorotrifluoroethane, trichloroethylene, and the like.

The foregoing discussion and the drawings are intended to be illustrative and are not to be taken as limiting. Still other variations and arrangements of parts within the spirit and scope of this invention are possible. For example, while in the foregoing illustrations the supercharger impeller is driven directly from the turbine shaft, the turbine can equally well drive a generator which is connected to an electric motor drivably engaging the supercharger impeller. Similarly, vaporizer coils can be embedded within the wall of the exhaust manifold or placed within the exhaust gas stream so as to be heated by the waste heat emanating from the internal combustion engine.

I claim:
1. Apparatus comprising in combination,
   1. an internal combustion engine having a completely independent liquid primary cooling system including a rediator and cooling fan, and
   2. apparatus for utilizing waste heat from said internal combustion engine comprising,
      a. supercharger means having an impeller mounted on said engine and situated in an air intake conduit of said internal combustion engine;
      b. turbine means driving said supercharger means and provided with a motive fluid inlet port and a motive fluid outlet port;
      c. vaporizer means intimately associated with said internal combustion engine, heated by said engine, and provided with a motive fluid outlet communicating with said motive fluid inlet port of said turbine means and provided with a motive fluid inlet;
      d. condenser means provided with a motive fluid inlet communicating via a confined flow passageway with said turbine outlet port and provided with a motive fluid outlet communicating with said vaporizer inlet, said condenser means being located in front of said radiator so that air circulating through said radiator also cools said condenser;
      e. a check valve means situated in said confined flow passageway between said turbine outlet port and said condenser inlet and permitting only unidirectional flow of motive fluid from said turbine means to said condenser means;
      f. said turbine means, vaporizer means and condenser means together defining a closed loop for circulating a motive fluid completely independent of the primary cooling system and of the fuel system of the internal combustion engine; and
      g. non-combustible motive fluid within said closed loop.

2. The apparatus in accordance with claim 1 wherein the vaporizer means is a coil situated adjacent the outer surface of an exhaust manifold of the internal combustion engine.

3. The apparatus in accordance with claim 1 wherein the vaporizer means is a coil situated within a cooling water conduit of the internal combustion engine.

4. The apparatus in accordance with claim 1 wherein the vaporizer means is a coil immersed in oil contained within the internal combustion engine.

5. The apparatus in accordance with claim 1 wherein the vaporizer means is a coil wrapped around portions of an exhaust manifold of the internal combustion engine.

6. The apparatus in accordance with claim 1 wherein the supercharger means is coaxially mounted on a common shaft with the turbine.

* * * * *